(12) United States Patent
Gregory et al.

(10) Patent No.: US 11,519,726 B2
(45) Date of Patent: Dec. 6, 2022

(54) MECHANISM FOR SELECTIVE COUPLING IN MICROELECTROMECHANICAL SYSTEMS INERTIAL SENSORS

(71) Applicant: Analog Devices, Inc., Norwood, MA (US)

(72) Inventors: Jeffrey A. Gregory, Malden, MA (US); Laura Cornelia Popa, Melrose, MA (US)

(73) Assignee: Analog Devices, Inc., Wilmington, MA (US)

( * ) Notice: Subject to any disclaimer, the term of this patent is extended or adjusted under 35 U.S.C. 154(b) by 57 days.

(21) Appl. No.: 16/906,484

(22) Filed: Jun. 19, 2020

(65) Prior Publication Data

US 2021/0396520 A1    Dec. 23, 2021

(51) Int. Cl.
G01C 19/5769    (2012.01)
G01C 19/5733    (2012.01)

(52) U.S. Cl.
CPC ..... G01C 19/5769 (2013.01); G01C 19/5733 (2013.01)

(58) Field of Classification Search
CPC .......... G01C 19/5769; G01C 19/5733
See application file for complete search history.

(56) References Cited

U.S. PATENT DOCUMENTS

| | | | |
|---|---|---|---|
| 6,650,806 B2 | 11/2003 | Rodgers et al. | |
| 6,877,374 B2 | 4/2005 | Geen | |
| 7,347,094 B2 | 3/2008 | Geen et al. | |
| 7,421,897 B2 | 9/2008 | Geen et al. | |
| 8,342,025 B2 | 1/2013 | Coronato et al. | |
| 8,616,057 B1* | 12/2013 | Mao | G01C 19/574 73/504.14 |
| 9,038,460 B2 | 5/2015 | Walther | |
| 9,506,756 B2 | 11/2016 | McNeil et al. | |
| 9,766,259 B2 | 9/2017 | Deimerly | |
| 9,791,274 B2 | 10/2017 | Kamal Said Abdel Aziz et al. | |
| 10,330,476 B2 | 6/2019 | Shao | |
| 10,520,315 B2 | 12/2019 | Tocchio et al. | |
| 2016/0305781 A1 | 10/2016 | Piirainen | |
| 2018/0120110 A1 | 5/2018 | Song et al. | |
| 2018/0172446 A1 | 6/2018 | Prikhodko et al. | |
| 2018/0172447 A1 | 6/2018 | Prikhodko et al. | |
| 2021/0364293 A1* | 11/2021 | Blomqvist | G01C 19/5747 |

FOREIGN PATENT DOCUMENTS

DE    102018210491 A1    1/2020
EP     2 108 964 A2      10/2009

* cited by examiner

Primary Examiner — Xin Y Zhong
(74) Attorney, Agent, or Firm — Wolf, Greenfield & Sacks, P.C.

(57) ABSTRACT

Couplers for selectively coupling in-plane and out-of-plane motion between moving masses are provided herein. In particular, aspects of the present application provide for a coupler configured to couple in-plane motion between moving masses while decoupling out-of-plane motion between the moving masses. The selective couplers as described herein may be used in a device, such as a microelectromechanical systems (MEMS) inertial sensor. In some embodiments, a MEMS inertial sensor comprises a first mass configured to move in-plane, a second mass configured to move in-plane and out-of-plane, and a coupler coupling the first and second masses and comprising two levers coupled to an anchor point by respective tethers and coupled to each other by a spring.

15 Claims, 13 Drawing Sheets

MECHANISM FOR SELECTIVE COUPLING IN MICROELECTROMECHANICAL SYSTEMS INERTIAL SENSORS

FIELD OF THE DISCLOSURE

The present application relates to a coupler for microelectromechanical systems (MEMS) inertial sensors having multiple moving masses.

BACKGROUND

MEMS devices may comprise multiple moving masses coupled together by one or more couplers. For example, gyroscopes (sometimes referred to simply as "gyros") are devices which are sensitive to rotation, and therefore which can be used to detect rotation. Microelectromechanical systems (MEMS) gyroscopes typically include a movable body, sometimes referred to as a "proof mass," to which an electrical signal is applied to produce motion predominantly along a particular axis. This is referred to as driving the proof mass, and the axis along which the proof mass is driven is sometimes referred to as the drive axis. When the gyroscope experiences rotation, the proof mass additionally moves along an axis different than the drive axis, sometimes referred to as the sense axis. The motion of the proof mass along the sense axis is detected, providing an indication of the rotation experienced by the gyroscope. For some MEMS gyroscopes, driving the proof mass may comprise causing motion of the proof mass in-plane. For some MEMS gyroscopes, rotation may be detected by sensing out-of-plane motion of the proof mass.

BRIEF SUMMARY

Some embodiments are directed a microelectromechanical systems (MEMS) inertial sensor, comprising: a first mass configured to move in-plane; a second mass configured to move in-plane and out-of-plane; and a coupler coupling the first and second masses and comprising two levers coupled to an anchor point by respective tethers and coupled to each other by a spring. In some embodiments, the first mass comprises a drive array. In some embodiments, the MEMS inertial sensor is a gyroscope configured to detect rotation from out-of-plane motion of the second mass. In some embodiments, the MEMS inertial sensor further comprises respective end connections connecting the two levers to the first and second masses. In some embodiments, the two levers comprise first and second levers, and a length of the second lever is at least twice the length of the first lever. In some embodiments, the first mass comprises a drive array and the first lever is coupled to the drive array by an end connection. In some embodiments, the two levers comprise first and second levers, the first lever is coupled to a first end of the spring and the second lever is coupled to a second end of the spring.

Some embodiments are directed to a microelectromechanical systems (MEMS) inertial sensor, comprising: a substrate; and first and second masses coupled to the substrate, and coupled together by a coupler and configured to move in-plane with each other; wherein the coupler comprises two levers coupled to respective masses of the first and second masses, the two levers being tethered to an anchor by respective tethers and coupled to each other by a spring. In some embodiments, the spring is a folded a spring. In some embodiments, the spring comprises first and second longer segments joined by a shorter segment. In some embodiments, at least one of the tethers comprises a folded tether. In some embodiments, the two levers are substantially in-line with each other. In some embodiments, the spring is offset from the two levers. In some embodiments, the two levers are offset from each other and the spring comprises a straight spring.

Some embodiments are directed to a microelectromechanical systems (MEMS) device, comprising: a substrate; a first mass; a second mass; and a coupler coupling the first and second masses together and configured to transfer in-plane motion between the first and second masses and to decouple out-of-plane motion of the first and second masses. In some embodiments the first mass comprises a drive array configured to cause in-plane motion of the second mass. In some embodiments, the MEMS device is a gyroscope configured to detect in-plane rotation from out-of-plane motion of the second mass. In some embodiments, the coupler is configured to absorb the out-of-plane motion of the first and second masses. In some embodiments, the coupler comprises a first lever, a second lever, and a folded spring coupling the first and second levers. In some embodiments, the first and second levers are coupled to an anchor point by respective tethers.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear. For purposes of clarity, not every component may be labeled in every drawing.

DETAILED DESCRIPTION

Figure 1:
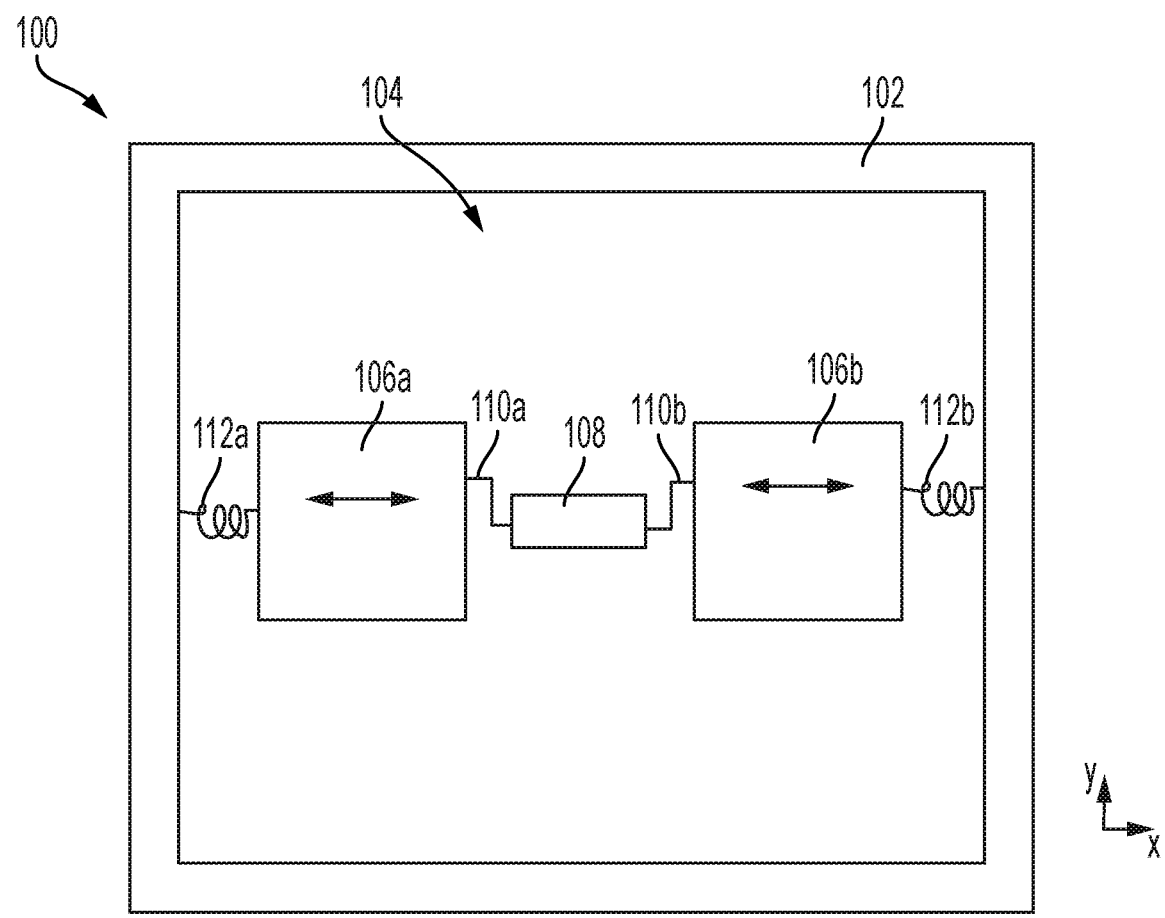
FIG. 1 is a schematic diagram of an example MEMS device having two moving masses coupled together by a coupler, according to some non-limiting embodiments.

Aspects of the present application provide a selective coupler for coupling in-plane motion between two moving masses of a microelectromechanical systems (MEMS) device while decoupling out-of-plane motion between the moving masses. In some embodiments, the coupler comprises two levers, each lever being coupled to a respective one of the two moving masses and being coupled together by a spring. The inventors have recognized that the couplers described herein provide for strong selective coupling between two moving masses without requiring the use of levers of varied thickness which may be difficult to manufacture. In particular, in at least some embodiments the couplers described herein provide selective coupling— whereby in-plane motion is coupled and out-of-plane motion is decoupled—with the use of two levers of substantially uniform thickness.

For some MEMS devices (e.g., MEMS gyroscopes), it may be desired to couple in-plane motion between moving masses of the MEMS device while decoupling out-of-plane motion between the moving masses which may otherwise lead to sensing inaccuracies and/or damage to the MEMS devices. In particular, for a MEMS gyroscope comprising one or more proof masses and one or more drive structures configured to drive the one or more proof masses in-plane, a coupler may be used to couple a drive structure to a proof mass and to couple in-plane motion between the drive structure and the proof mass to facilitate the driving of the proof mass. The MEMS gyroscope may be configured to detect rotation (for example, rotation about the pitch axis), by sensing out-of-plane motion of the proof mass caused by the rotation. However, out-of-plane motion of the proof mass not caused by rotation, but rather caused by out-of-plane motion of the drive structure which is coupled to the proof mass, may cause the MEMS gyroscope to artificially detect rotation even when no rotation has occurred. In addition, coupling of the out-of-plane motion of the proof masses to the drive structures may weaken the structural integrity of the MEMS gyroscope by damaging the drive structures and their respective connections. Thus, in some applications, it may be desirable to provide for strong coupling of in-plane motion while minimizing (e.g., decoupling) out-of-plane motion between two moving masses.

Thus, according to an aspect of the present application, there is provided a coupler, coupling a first moving mass to a second moving mass comprising two levers connected by respective tethers to an anchor and coupled together by a spring. The coupler may be configured to couple in-plane motion between the moving masses while decoupling out-of-plane motion of the moving masses. According to an aspect of the present application, the levers of the coupler may be coupled together by a curved spring. For example, the levers may be substantially in-line with each other and the spring may be offset from the levers. The inventors have recognized that use of a curved spring offset from the levers enables a more area efficient configuration of the coupler as no offset between the levers is required. According to a further aspect of the present application, the levers of the coupler may be disposed offset from each other. The inventors have recognized that by disposing the levers offset from each other the levers may be coupled together by a straight spring as opposed to a curved spring.

Some embodiments provide for a MEMS inertial sensor comprising a first mass configured to move in-plane, a second mass configured to move in-plane and out-of-plane, and a coupler coupling the first and second masses and comprising two levers coupled to an anchor point by respective tethers and coupled to each other by a spring.

In some embodiments, a MEMS inertial sensor is provided, the MEMS inertial sensor comprising a substrate, and first and second masses coupled to the substrate, and coupled together by a coupler and configured to move in-plane with each other, wherein the coupler comprises two levers coupled to respective masses of the first and second masses, the two levers being tethered to an anchor by respective tethers and coupled to each other by a spring.

In some embodiments, there is provided a MEMS device comprising a substrate, a first mass, a second mass, and a coupler coupling the first and second masses together and configured to transfer in-plane motion between the first and second masses to decouple out-of-plane motion of the first and second masses.

A variety of MEMS devices may implement the selective couplers described herein. For example resonators, gyroscopes, and accelerometers may make use of the selective couplers described herein. More generally, the selective couplers may be used to couple any two moving masses in which a first of the two masses is configured to move in-plane and a second of the two moving masses is configured to move in-plane and out-of-plane.

The aspects and embodiments described above, as well as additional aspects and embodiments, are described further below. These aspects and/or embodiments may be used individually, all together, or in any combination, as the technology is not limited in this respect.

An example of a MEMS device implementing a coupler to couple two moving masses is depicted in FIG. 1. FIG. 1 is a schematic diagram of an example MEMS device 100 having two moving masses 106a, 106b coupled together by a coupler 108, according to some non-limiting embodiments.

Each of the masses 106a, 106b may move in-plane (in the x-y plane) and/or out-of-plane (in the z-direction). For example, at least one of the masses 106a, 106b may move both in-plane and out-of-plane and the other of the moving masses 106a, 106b may at least move in-plane. In particular, moving masses 106a, 106b are configured to move in the positive and negative x-direction as indicated by the double-headed arrows in FIG. 1. In some embodiments, for example, as shown in the illustrated embodiment, both of the masses 106a, 106b move both in-plane and out-of-plane.

The masses 106a, 106b may be any pair of moving masses where one of the masses moves in-plane and the other of the masses moves both in-plane and out of plane. For example, a first of the masses may be a proof mass of a MEMS inertial sensor (e.g., a MEMS gyroscope), and the other of the masses may be a drive structure of the MEMS inertial sensor configured to cause in-plane motion of the first mass. Thus, the selective coupler described herein may be implemented in MEMS inertial sensors, according to some non-limiting embodiments.

Coupler 108 may provide for selective coupling of the masses 106a, 106b. In particular, coupler 108 may be configured to couple in-plane motion between the masses 106a, 106b while decoupling out-of-plane motion of the masses 106a, 106b. For example, in-plane motion of mass 106a may be coupled, through coupler 108, to mass 106b, while out-of-plane motion of mass 106a is prevented from coupling to mass 106b. Instead, the coupler 108 is configured such that the out-of-plane motion of mass 106a is absorbed by the coupler 108. Likewise, in-plane motion of mass 106b may be coupled to mass 106a through coupler 108 while out-of-plane motion of mass 106b is prevented from coupling to mass 106a. The inventors have recognized that such selective coupling may be advantageous, for example, in MEMS inertial sensors which use in-plane drive motion and out-of-plane sense motion.

As will be described further herein, for example, with respect to FIG. 2A, the coupler 108 may facilitate selective coupling through a split-lever configuration. In particular, the coupler 108 may include two levers coupled together by a spring and coupled to an anchor by a respective tether.

The coupler 108 may be coupled to each mass 106a, 106b at a respective end of the coupler by springs. In the illustrated embodiment, spring 110a couples coupler 108 to mass 106a at a first end of the coupler and spring 110b couples coupler to mass 106b at a second end of the coupler. Springs 110a, 110b may be of any suitable type (e.g., straight, curved, etc.) and may be compliant in-plane and/or out-of-plane such that an angle between the respective mass 106a, 106b and the coupler 108 may be formed upon motion of the respective mass 106a, 106b.

The mases 106a, 106b may further be coupled to a substrate 102 by respective springs. In particular, spring 112a couples mass 106a to the substrate 102 and spring 112b couples mass 112b to the substrate 102. The springs 112a, 112b may be of any suitable type (e.g., straight, curved, etc.) and may be compliant in-plane and/or out-of-plane. In the illustrated embodiment, the substrate 102 forms a cavity 104 in which the masses 106a, 106b are disposed. In some embodiments, the masses 106a, 106b are disposed above an underlying substrate. The substrate 102 may comprise any suitable integrated circuitry configured to cause and/or sense motion of the masses 106a, 106b.

Figure 2A:
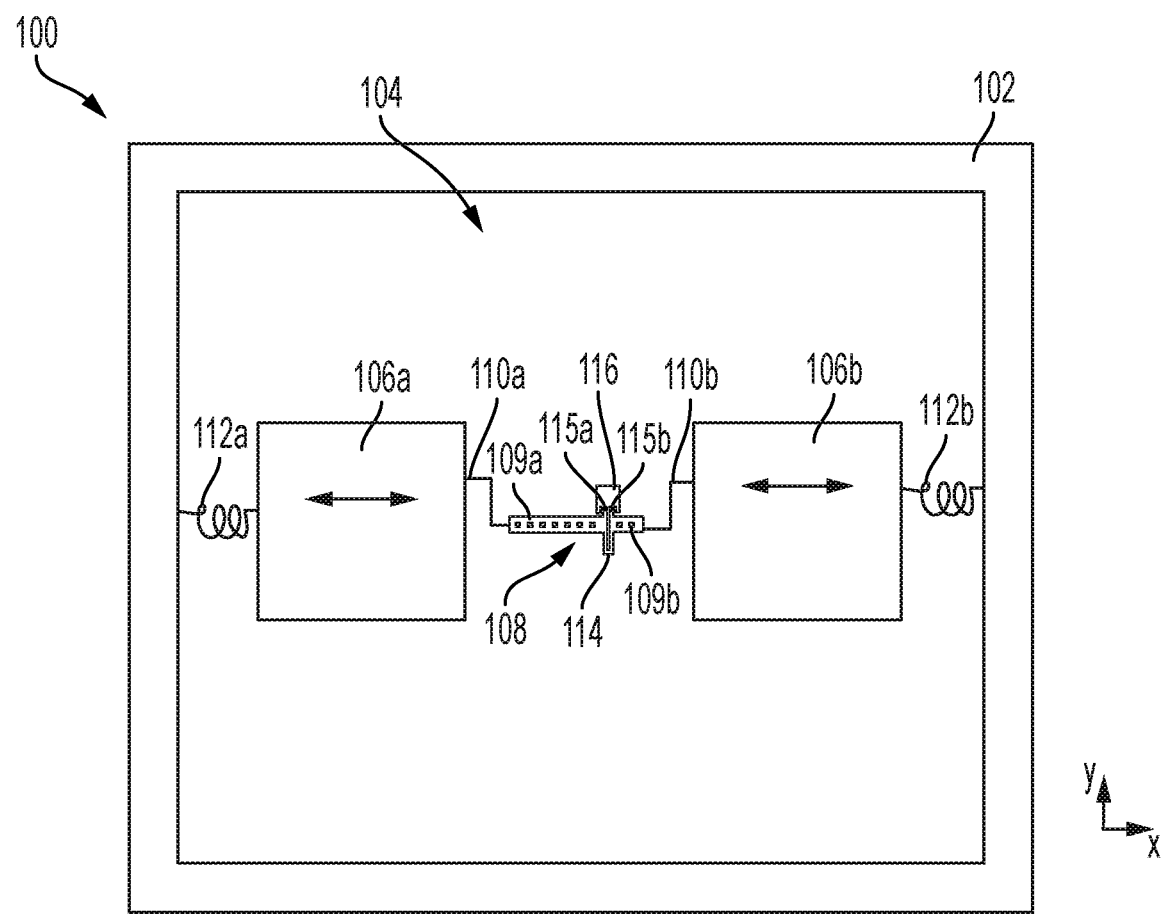
FIG. 2A is a schematic diagram of the example MEMS device of FIG. 1 further illustrating details of the coupler, according to some non-limiting embodiments.

FIG. 2A is a schematic diagram of the example MEMS device of FIG. 1 further illustrating details of the coupler, according to some non-limiting embodiments. As shown in FIG. 2A, coupler 108 is split, comprising first and second levers 109a and 109b. In the illustrated embodiment, first lever 109a is coupled to mass 106a and second lever 109b is coupled to mass 106b. First and second levers 109a, 109b may be coupled together to effectively couple masses 106a and 106b together, as described herein. The inventors have recognized that the split lever configuration of coupler 108 may facilitate strong coupling of in-plane motion between moving masses while decoupling out-of-plane motion between the moving masses. Further, the inventors have recognized that the split lever configuration described herein allows for selective coupling using levers which have substantially the same thickness. For example, as shown in FIG. 2C, first lever 109a may have thickness T1 and second lever 109b may have thickness T2, with T1 being substantially equal to T2 in some embodiments. The coupling is selective, in at least some embodiments, in that in-plane motion may be coupled while out-of-plane motion may be decoupled.

The first and second levers 109a, 109b may be coupled to each other by a spring 114. In some embodiments, for example, the embodiment illustrated in FIG. 2A, the spring 114 coupling the first and second levers 109a, 109b may be curved. In such embodiments, the first and second levers 109a, 109b may be substantially in-line with each other, while the spring 114 is offset from the first and second levers 109a, 109b. In particular, the curved portion of the spring 114 may be offset from the first and second levers 109a, 109b. Such a configuration may be area-efficient enabling manufacture of MEMS devices of smaller size. In other embodiments, as described herein, the spring 114 may be a straight spring.

In embodiments where the spring 114 comprises a curved spring, the curved spring may have any suitable shape and configuration. For example, in some embodiments, the curved spring comprises a smooth curve, while in other embodiments, the curved spring is a multi-segment spring being formed from multiple straight segments. In some embodiments, the curved spring is u-shaped, however, any suitable shape is possible. In the illustrated embodiment, the spring 114 is formed by two longer segments being substantially parallel when the spring 114 is not displaced, and a shorter segment coupling the two longer segments. As will be described further herein, the relative size and stiffness of the spring and its segments, for a multi-segment spring, may be controlled to facilitate the selective coupling of the coupler 108.

Each of the first and second levers 109a, 109b may be coupled to an anchor 116 fixed to the substrate 102. In the illustrated embodiment, each of the levers is coupled to a single anchor 116, however, in other embodiments, the levers 109a, 109b may be coupled to respective anchors, and the aspects of the technology described herein are not limited in this respect. In some embodiments, the anchor may be offset from the two levers 109a, 109b, for example, offset from the respective tethers 115a, 115b, as described herein.

Each of the first and second levers 109a, 109b may be coupled to the anchor 116 by a respective tether 115a, 115b. For example, as shown in FIG. 2A, tether 115a couples first lever 109a to anchor 116 and tether 115b couples second lever 109b to anchor 116. In some embodiments, the tethers comprise springs which couple a moving component (e.g., the lever) to a fixed component (e.g., the anchor). The tethers 115a, 115b of the illustrated embodiment may be compliant in-plane and out-of-plane.

The tethers may be configured having any suitable shape, as will be described further herein. In some embodiments, a first of the respective tethers may differ in shape from a second of the respective tethers. In some embodiments, the respective tethers may have different lengths while in other embodiments, the tethers have the same length. Each of the tethers may have a length equal to or greater than 10 μm and equal to or less than 50 μm. In some embodiments, the tethers have a length shorter than that of the spring coupling the first and second levers.

The relative length of the first and second levers may be controlled by the location of the anchor. For example, as shown in FIG. 2A, the anchor 116 is located closer to mass 106b than mass 106a, and thus the first lever 109a is longer than the second lever 109b. The inventors have recognized that the relative lengths of the levers may be configured as desired to control relative displacement of the masses 106a, 106b coupled to the levers. For example, a mass coupled to the relatively shorter lever will experience less displacement from in-plane motion coupled through the coupler 108 than the mass coupled to the relatively longer lever. The inventors have recognized that such a configuration may be desirable for certain MEMS inertial sensors, for example, a gyroscope where the moving masses comprise a proof mass and a drive structure. In particular, it may be desirable to allow the proof mass to be displaced a larger amount than the drive structures such that relatively less motion of the drive structure is required to drive the proof masses. Therefore, in some embodiments, the masses comprise a proof mass and a drive structure, the proof mass may be coupled to the lever having a relatively longer length, and the drive structure may be coupled to the lever having the relatively shorter length.

In some embodiments, the first lever may be twice as long as the second lever (e.g., the levers of the coupler having a 2:1 length ratio). In some embodiments, the first and second levers may have a 60:40 length ratio, a 70:30 length ratio; a 75:25 length ratio, any ratio between 60:40 and 75:25, or any other suitable length ratio for controlling the desired displacement of the masses. Further still, in some embodiments, the first and second levers may be of a substantially equal length. The coupler 108 may be relatively small, on the order of 100 microns in length, in some embodiments.

Figure 2B:
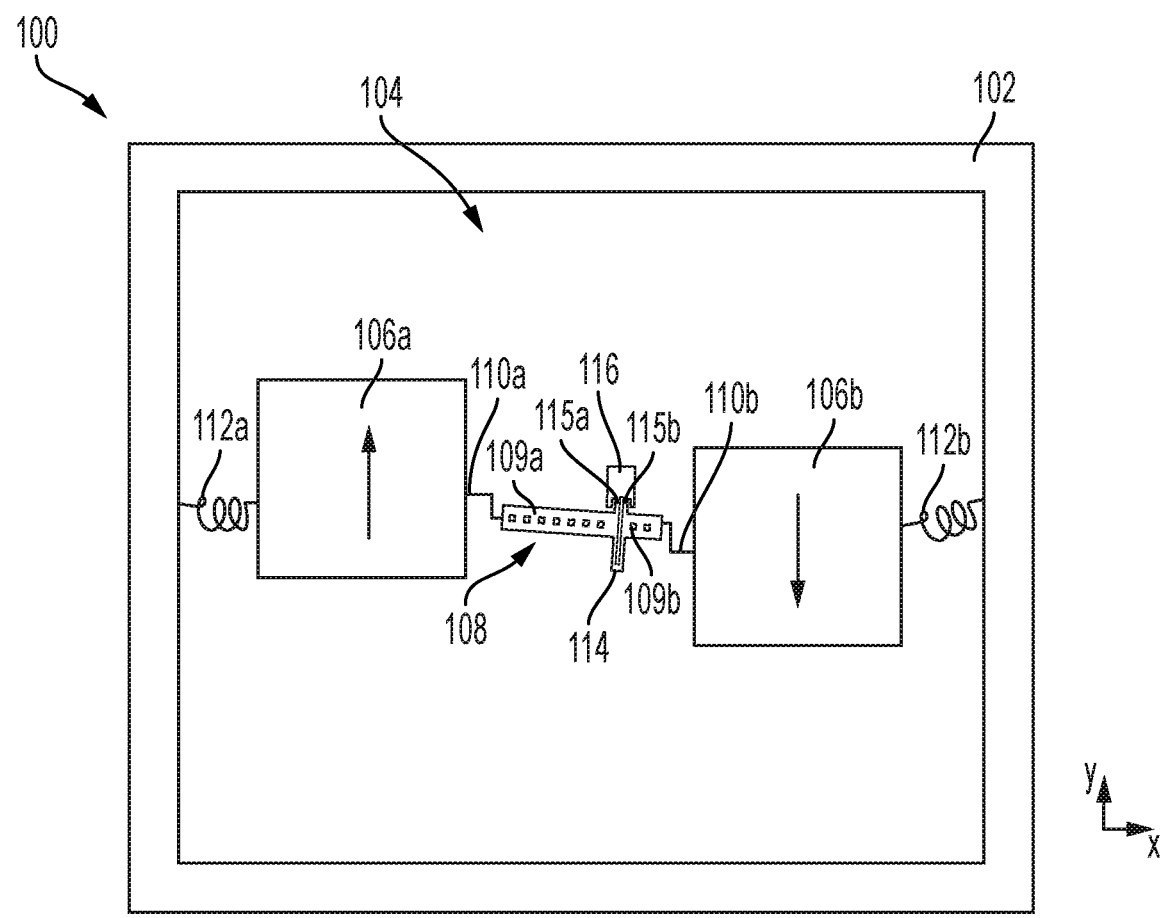
FIG. 2B is a schematic diagram of the example MEMS device of FIG. 2A showing in-plane displacement of the moving masses, according to some non-limiting embodiments.
Figure 2C:
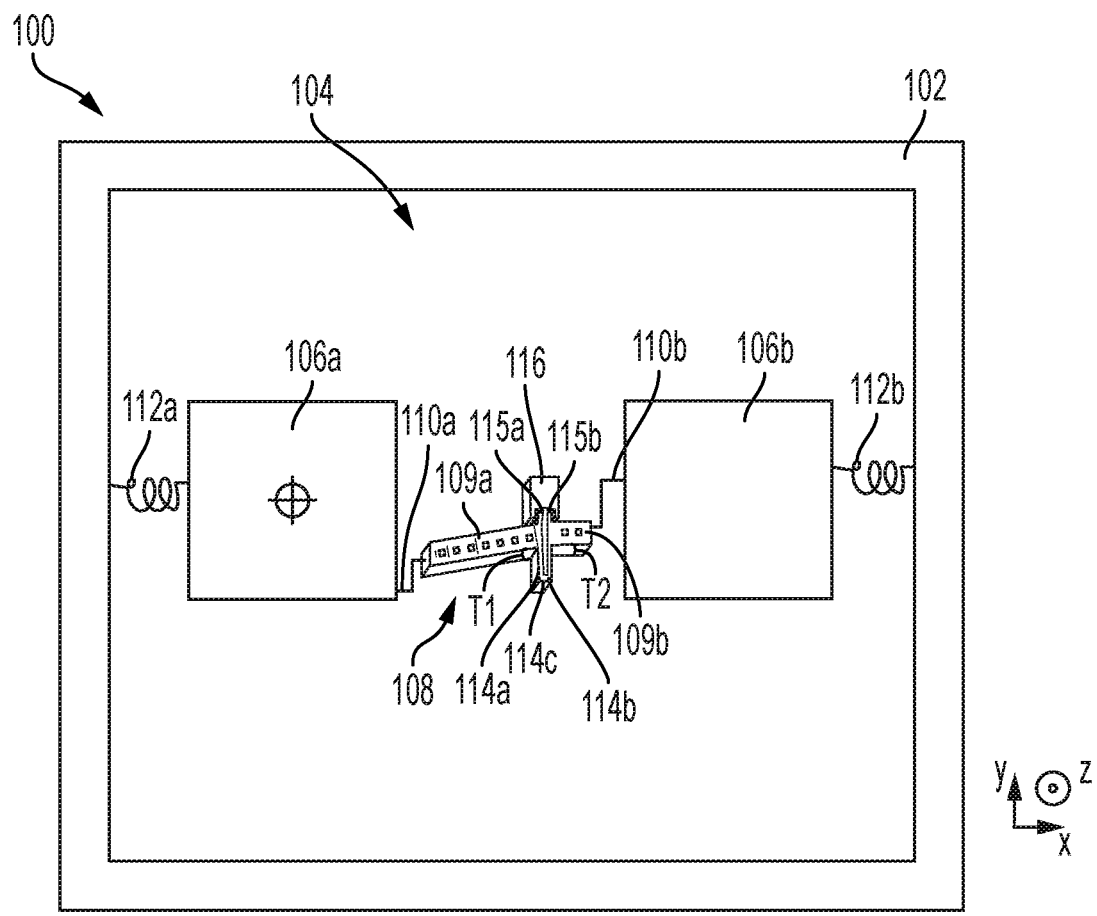
FIG. 2C is a schematic diagram of the example MEMS device of FIG. 2A showing out-of-plane displacement of one of the moving masses, according to some non-limiting embodiments.

FIG. 2B is a schematic diagram of the example MEMS device of FIG. 2A showing in-plane displacement of the moving masses, according to some non-limiting embodiments. As described herein, the coupler 108 may facilitate coupling in-plane motion between moving masses. As shown in FIG. 2B, mass 106A is moving in-plane in the positive y-direction. The motion of mass 106A is coupled to mass 106b through coupler 108 causing mass 106b to move in the negative y-direction.

Although in the illustrated embodiment, the coupler 108 transfers the in-plane motion of mass 106A to mass 106b causing mass 106b to move in the opposite direction along the y-axis, in some embodiments, the coupler 108 may be configured to transfer in-plane motion between moving masses such that both masses move in the same direction. In some embodiments, the in-plane motion transferred by the coupler 108 may be in the x-direction such that motion of the first mass in the x-direction causes motion of the second mass in the x-direction, either in the same or opposite direction as the motion of the first mass.

As described herein, the magnitude of the transferred motion may be controlled, such that displacement of the first mass may cause relatively less or relatively more displacement of the second mass than the displacement of the first mass, for example, by controlling the relative lengths of the first and second levers. In some embodiments, the magnitude of the transferred motion to the second mass may be substantially equal to the initial displacement of the first mass.

Coupling of in-plane motion between masses 106a, 106b may be facilitated through the coupler 108, and in particular, tethers 115a, 115b and spring 114. In the illustrated embodiment, when one of the masses 106a, 106b moves in-plane, the spring 114 assumes substantially the same angle on both sides of the spring 114. More particularly, the compliancy of the shorter segment of spring 114 may prevent the longer segments 114 from assuming different angles when the masses 106a, 106b move in-plane. Likewise, when the masses 106a, 106b move in-plane, the respective tethers 115a, 115b may assume substantially the same angle.

FIG. 2C is a schematic diagram of the example MEMS device of FIG. 2A showing out-of-plane displacement of one of the moving masses, according to some non-limiting embodiments. As described herein, coupler 108 may prevent out-of-plane motion of one moving mass from coupling, through coupler, to the other moving mass. As shown in FIG. 2C, mass 106a is moving out-of-plane in the negative z-direction. However, the out-of-plane motion of mass 106a is not transferred to mass 106b, but rather is absorbed by coupler 108.

In particular, spring 114 and tethers 115a, 115b may facilitate decoupling of out-of-plane motion between masses 106a, 106b. As described herein, the spring 114 may be a curved spring comprising multiple segments. In the illustrated embodiment, spring 114 comprises segments 114a, 114b, and 114c. As described herein, segment 114c of spring 114 may be configured being stiffer or less compliant out-of-plane (including being not compliant out-of-plane) than segments 114a, 114b. In some embodiments, for example, the embodiments illustrated in FIG. 2C, this may be achieved by configuring segment 114c to be shorter than segments 114a, 114b. When mass 106a moves out-of-plane, the stiffness of shorter segment 114c may prevent spring 114 from bending fully, and in particular, from allowing segment 114b to bend. Instead, tether 115a and spring segment 114a, both of which may be compliant out-of-plane, allow mass 106a and lever 109a to move out-of-plane while absorbing the out-of-plane motion of mass 106a and lever 109a so that the motion may not be transferred to the second lever 109b through segment 114b. In this way, tether 115a and spring segment 114a assume different angles than counterpart tether 115b and spring segment 114b, and the out-of-plane motion of mass 106a does not cause mass 106b to be displaced.

As described herein, the first and second levers 109a, 109b may have substantially the same thickness. For example, first lever 109a may have thickness T1 and second lever 109b may have thickness T2. In some embodiments, T1 may be substantially equal to T2 such that the thicknesses of the respective first and second levers 109a, 109b are substantially uniform.

Figure 3:
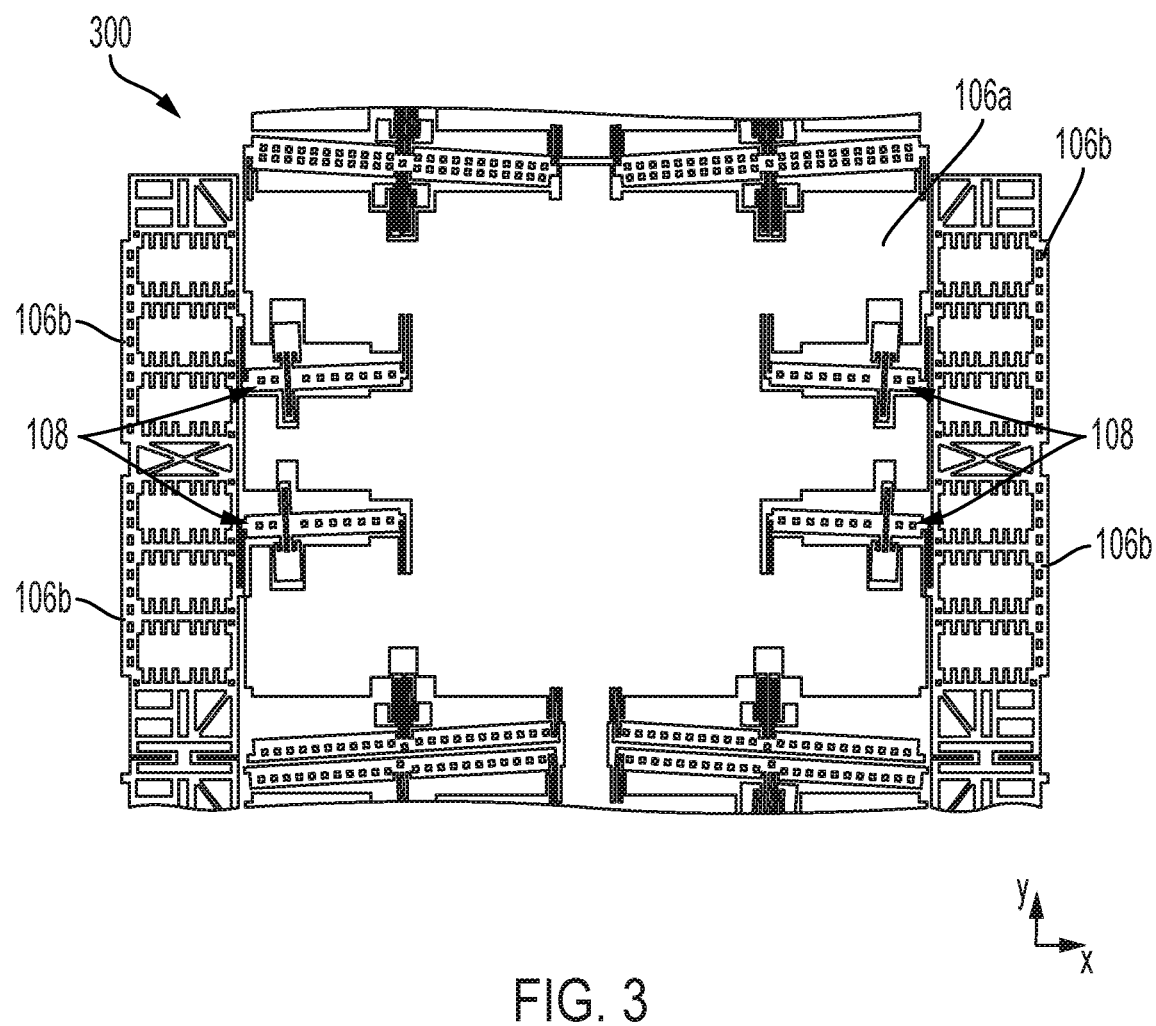
FIG. 3 is a schematic diagram of an example MEMS device having double-lever couplers coupling the proof mass to a drive structure, according to some non-limiting embodiments.

As described herein, the MEMS device 100 may be implemented as an inertial sensor. For example, FIG. 3 is a schematic diagram of an example MEMS device 300 having double-lever couplers coupling a proof mass to a drive structure, according to some non-limiting embodiments. In the illustrated embodiment, the MEMS device 300 comprises a first moving mass 106a configured in the illustrated embodiment as a proof mass, and second moving masses 106b configured as drive structures coupled to the proof mass 106a via respective couplers 108. In the illustrated embodiment, the proof mass 106a is coupled to four drive structures 106b, however any suitable number of drive structures may be coupled to the proof mass 106a.

The MEMS device 300 may form all or a portion of a MEMS gyroscope configured to sense rotation about one or more axes. In some embodiments, the proof mass 106a may be driven by one or more of the drive structures 106b. For example, in the illustrated embodiment, the MEMS device 300 is configured to drive the proof mass 106a in-plane along the y-axis and to sense pitch rotation of the MEMS gyroscope occurring about the x-axis by sensing the resulting out-of-plane motion along the z-axis of the proof mass 106a caused by the rotation. For example, in-plane motion of the one or more drive structures 106b may be coupled to proof mass 106a through coupler 108 causing proof mass 106a to move in-plane. However, the out-of-plane pitch motion of the proof mass 106a may not be coupled to the drive structures 106b due to the selective coupling of coupler 108 which decouples out-of-plane motion between the first and second moving masses 106a, 106b.

In some embodiments, the selective couplers described herein may be implemented in a MEMS inertial sensor having multiple sets of moving masses. For example, a MEMS gyroscope may be configured having multiple proof masses (e.g., at least three proof masses, or at least four proof masses) and respective drive structures 106b coupled to respective ones of the proof masses 106a via couplers 108. In some embodiments, the multiple proof masses and respective drive structures may be arranged in a column configured to sense pitch rotation of the MEMS gyroscope. The column of proof masses configured to sense pitch may be, in some embodiments, coupled to one or more other columns of proof masses configured to sense rotation about one or more other axes (e.g., roll and/or yaw) to form a MEMS gyroscope capable of sensing motion in multiple degrees of freedom.

Figure 4:
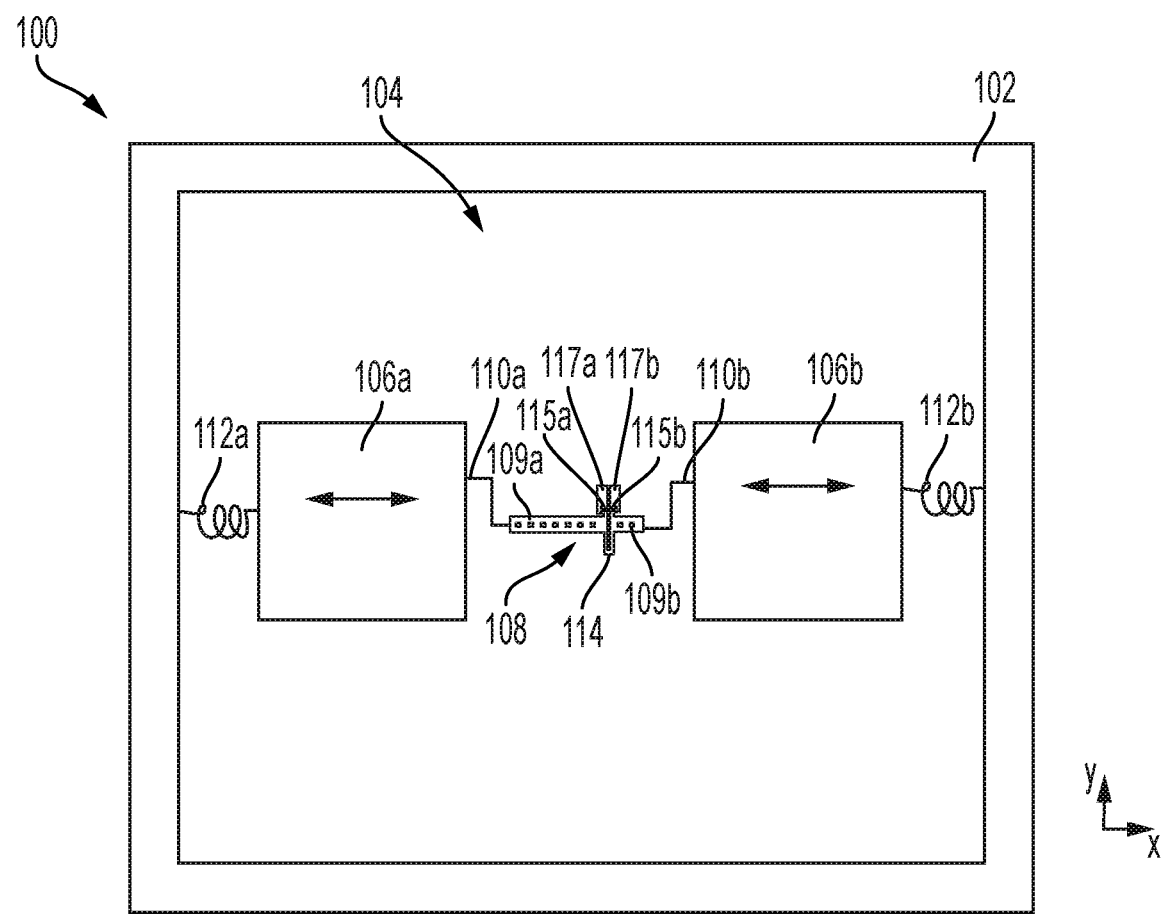
FIG. 4 is a schematic diagram of the example MEMS device of FIG. 2A having a respective anchor for each tether, according to some non-limiting embodiments.

FIG. 4 is a schematic diagram of the example MEMS device of FIG. 2A having a respective anchor for each tether, according to some non-limiting embodiments. As described herein, the respective tethers 115a, 115b may couple first and second levers 109a, 109b to respective anchors 117a, 117b fixed to the substrate 102. In particular, tether 115a couples first lever 109a to anchor 117a and tether 115b couples second lever 109b to anchor 117b.

Figure 5:
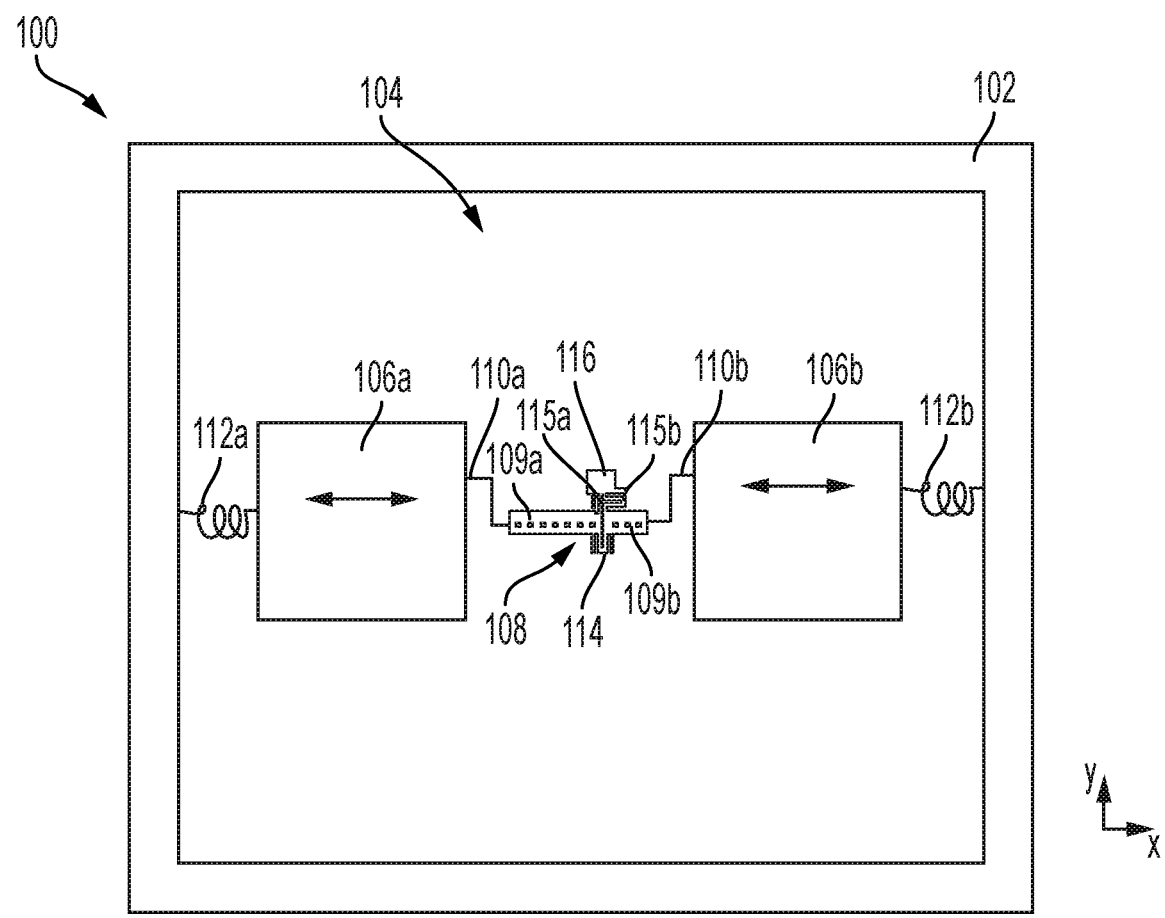
FIG. 5 is a schematic diagram of the example MEMS device of FIG. 1, having an alternative implementation of the coupler coupling the moving masses, according to some non-limiting embodiments.

FIG. 5 is a schematic diagram of the example MEMS device of FIG. 1, having an alternative implementation of the coupler coupling the moving masses, according to some non-limiting embodiments. In particular, FIG. 5 illustrates an alternative implementation of tethers 115a, 115b of coupler 108 which couple first and second levers 109a, 109b to anchor 116.

As described herein, the tethers may be configured having any suitable shape. In the illustrated embodiment, tether 115a comprises a folded spring (e.g., a folded tether) while tether 115b comprises a straight spring. The inventors have recognized that the configuration of the tethers may impact the relative displacement and frequency of the mass to which the tether is coupled. In particular, the inventors have recognized that configuring one or more of the tethers as folded springs may allow for reducing the frequency of the motion of the first and/or second moving masses to which the tethers are coupled.

In some embodiments, the shape of the tethers may be configured to control the relative displacement and frequency of the moving masses. For example, in some embodiments, the MEMS device 100 comprises a MEMS inertial sensor, the first moving mass 106a comprises a proof mass and the second moving mass 106b comprises a drive structure configured to drive the proof mass 106a. In some such embodiments, the second tether 115b coupling the drive structure 106b to the anchor 116 may comprise a folded spring to soften the drive mode velocity (e.g., by reducing the frequency of the drive motion coupled to the proof mass by approximately 20 times that of the initial frequency). The inventors have recognized that the ability to control the displacement and frequency of the moving masses through the configuration of the tethers may be advantageous as it facilitates frequency matching between respective proof masses of a MEMS inertial sensor (e.g., between proof masses of different columns of a multi-column MEMS inertial sensor). In the illustrated embodiment, only the second tether 115b coupling the drive structure 106b to the anchor 116 comprises a folded spring while the first tether 115a coupling the proof mass 106a to the anchor 116 comprises a straight spring, however, in some embodiments, the first tether 115a may additionally or alternatively comprise a folded spring to soften the frequency and displacement of the proof mass 106a.

Figure 6:
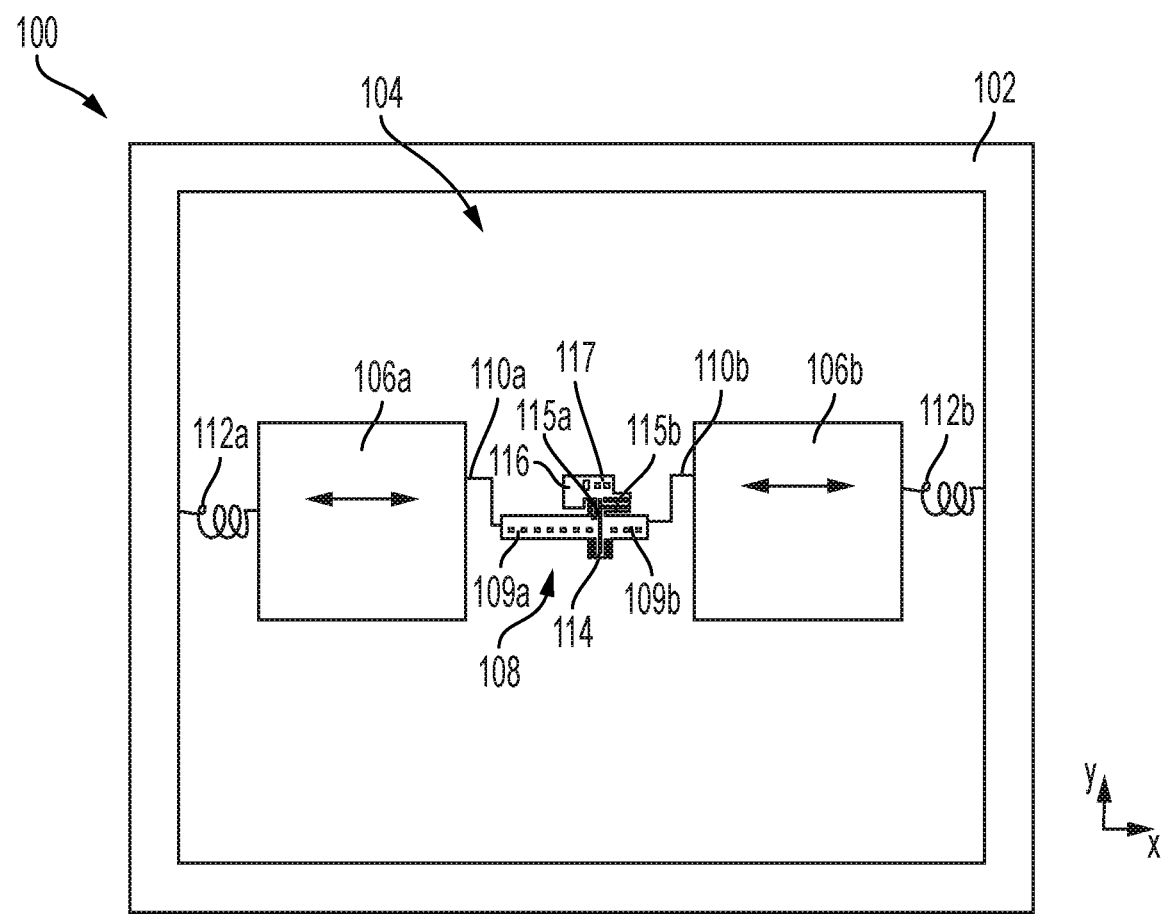
FIG. 6 is a schematic diagram of the example MEMS device of FIG. 1, having an alternative implementation of the coupler coupling the moving masses, according to some non-limiting embodiments.

FIG. 6 is a schematic diagram of the example MEMS device of FIG. 1, having an alternative implementation of the coupler coupling the moving masses, according to some non-limiting embodiments. As shown in FIG. 6, in some embodiments, the first and second tethers may not be coupled directly to the anchor 116 and may instead by coupled to one or more intermediate components (e.g., beam 117) coupled to the anchor 116. In particular, the anchor 116 may be coupled to a beam 117 and the first and second tethers 115a, 115b may also be coupled to the beam 117. In some embodiments, the beam 117 is rigid, such that it does not move relative to the anchor 116. The intermediate component may be a beam, a cantilever, a projection, or other suitable rigid structure forming a rigid body with the anchor 116.

The inventors have recognized that the use of one or more intermediate components (such as beam 117) to indirectly couple first and second tethers 115a, 115b to anchor 116 allows for offsetting anchor 116 from the first and second tethers 115a, 115b, which may facilitate enhanced control over the dimensions of the MEMS device 100. For example, in some embodiments, the intermediate component may be have smaller dimensions than the dimensions of the anchor (for example, having smaller dimensions in the x-y plane) such that offsetting the anchor from the first and second tethers provides additional flexibility in dimensions of coupler components, such as the first and second tethers. As described herein, the tethers may vary in shape, for example, as shown in FIG. 5. Further, as described herein, the tethers may vary in length to control the selective coupling of the coupler. For example, the tethers may be configured being shorter in length in the y-direction than the length of the spring coupling the first and second levers. Offsetting the anchor from the coupler and coupling the first and second tethers to the intermediate component which may be smaller than the anchor may provide for increased flexibility in the size and shape of the tethers.

Figure 7A:
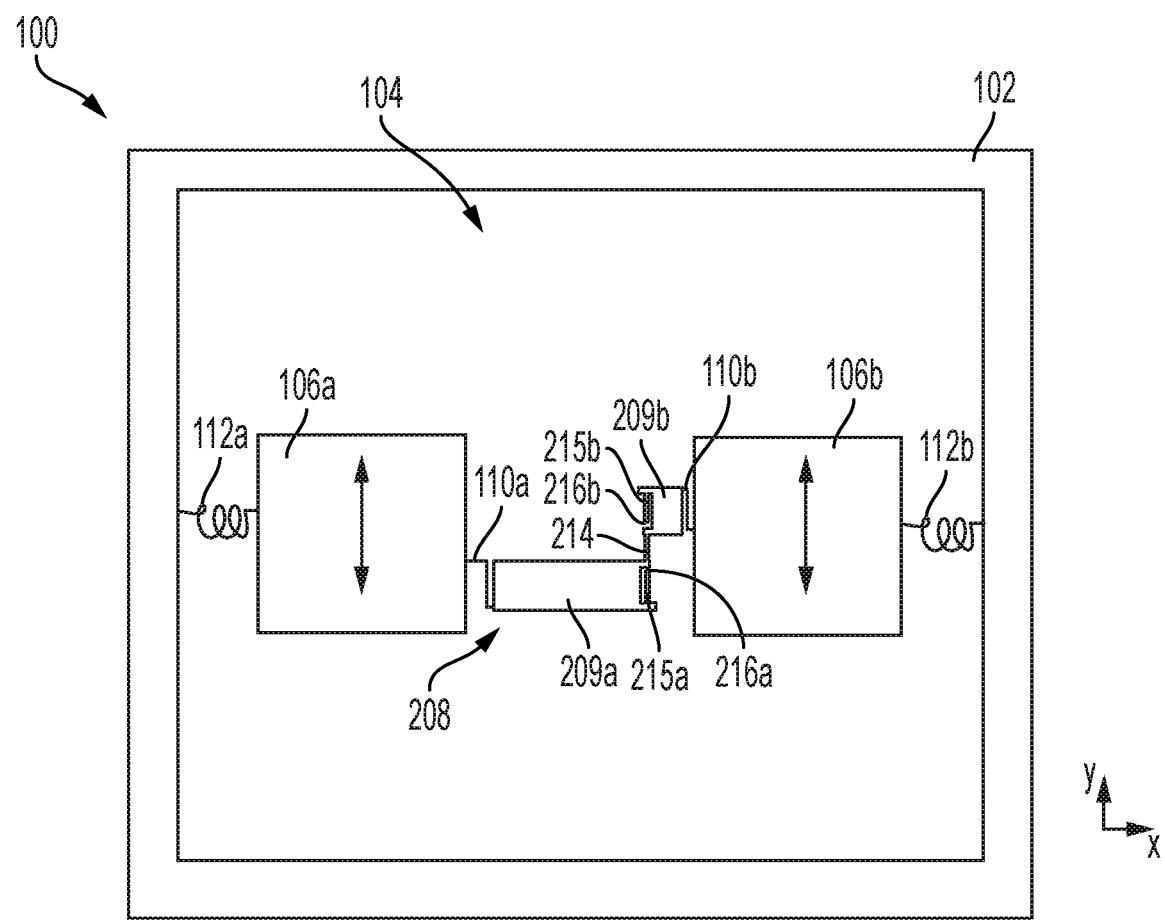
FIG. 7A is a schematic diagram of an example MEMS device having two moving masses coupled together by a coupler, according to some non-limiting embodiments.

FIG. 7A is a schematic diagram of an example MEMS device having two moving masses coupled together by a coupler, according to some non-limiting embodiments. In particular, FIG. 7A illustrates an alternative implementation of a selective coupler 208 for coupling first and second moving masses 106a, 106b of MEMS device 100 together, the coupler 208 being configured to couple in-plane motion and decouple out-of-plane motion between the first and second moving masses 106a, 106b. As described herein, in some embodiments, the selective coupler may comprise first and second levers disposed offset from each other. For example, coupler 208 comprises a first lever 209a coupled to the first mass 106a by spring 110a and a second lever 209b coupled to the second mass 106b by spring 110b, the first and second levers 209a, 209b. Here, the first and second levers 209a, 209b are not in-line with each other, as opposed to the configuration of levers of FIG. 2A. Instead, the first and second levers 209a, 209b are offset from each other in the y-direction.

As described herein, the couplers described herein may comprise a split lever having first and second levers with lengths of the first and second levers controlled to achieve a desired displacement ratio between the first and second moving masses coupled by the levers. For example, first and second levers 209a, 209b may have any of the lengths described previously herein in connection with first and second levers 109a, 109b of coupler 108 in FIGS. 2A-2C. In the illustrated embodiment, the first lever 209a is longer than second lever 209b such that displacement of the first mass 106a due to in-plane motion coupled to first mass 106a through coupler 208 is relatively larger than displacement of the second mass 106b due to in-plane motion coupled to the second mass 106b through coupler 208.

First and second levers 209a, 209b may further have any of the thicknesses described previously herein in connection with first and second levers 109a, 109b of coupler 108 in FIGS. 2A-2C. In some embodiments, first and second levers 209a, 209b have substantially the same thickness.

The first and second levers 209a, 209b are coupled together by a spring 214. In the illustrated embodiment, spring 214 comprises a straight spring. As described herein, spring 214 is configured to enforce coupling of in-plane motion between the first and second moving masses 106a, 106b while decoupling out-of-plane motion between the moving masses. For example, in-plane motion of mass 106a may be coupled, through coupler 208, to mass 106b, while out-of-plane motion of mass 106a is prevented from coupling to mass 106b. Instead, the coupler 208 is configured such that the out-of-plane motion of mass 106a is absorbed by the coupler 208, for example, by spring 214, as described herein. Likewise, in-plane motion of mass 106b may be coupled to mass 106a through coupler 208 while out-of-plane motion of mass 106b is prevented from coupling to mass 106a, and in at least some embodiments is, compliant both in-plane and out-of-plane. As described further herein, spring 214 may be more compliant out-of-plane, meaning torsionally compliant, than in-plane, meaning bendably compliant, such that spring 214 is less resistant to motion out-of-plane than in-plane, for example, as shown in FIGS. 7B-7C.

Coupler 208 may further comprise first and second tethers 215a, 215b coupling the first and second levers 209a, 209b to respective anchors 216a, 216b, which may be coupled to an underlying substrate (e.g., substrate 102). For example, first tether 215a may couple first lever 209a to first anchor 216a and second tether 215b may couple second lever 209b to second anchor 216b. In some embodiments, first and second tethers 215a, 215b comprise springs which couple a moving component (e.g., a lever) to a fixed component (e.g., and anchor). The first and second tethers 215a, 215b of the illustrated embodiment may be compliant in-plane and may be disposed at a point which experiences little to no displacement out-of-plane along the z-axis.

As described herein, the tethers of selective coupler may vary in shape and dimensions. For example, first and second tethers 215a, 215b may have any of the shapes and/or dimensions described previously herein in connection with first and second tethers 115a, 115b.

Figure 7B:
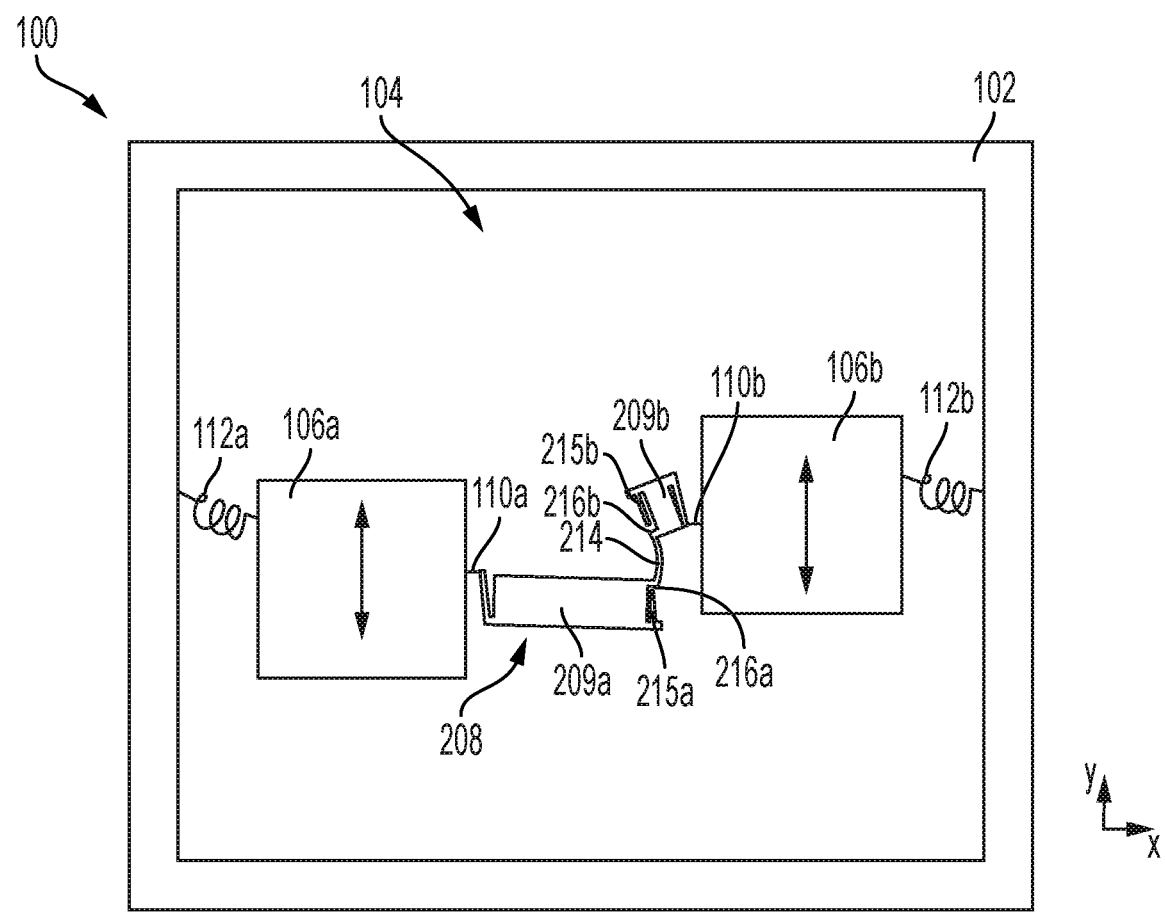
FIG. 7B is a schematic diagram of the example MEMS device of FIG. 7A showing in-plane displacement of the moving masses, according to some non-limiting embodiments.
Figure 7C:
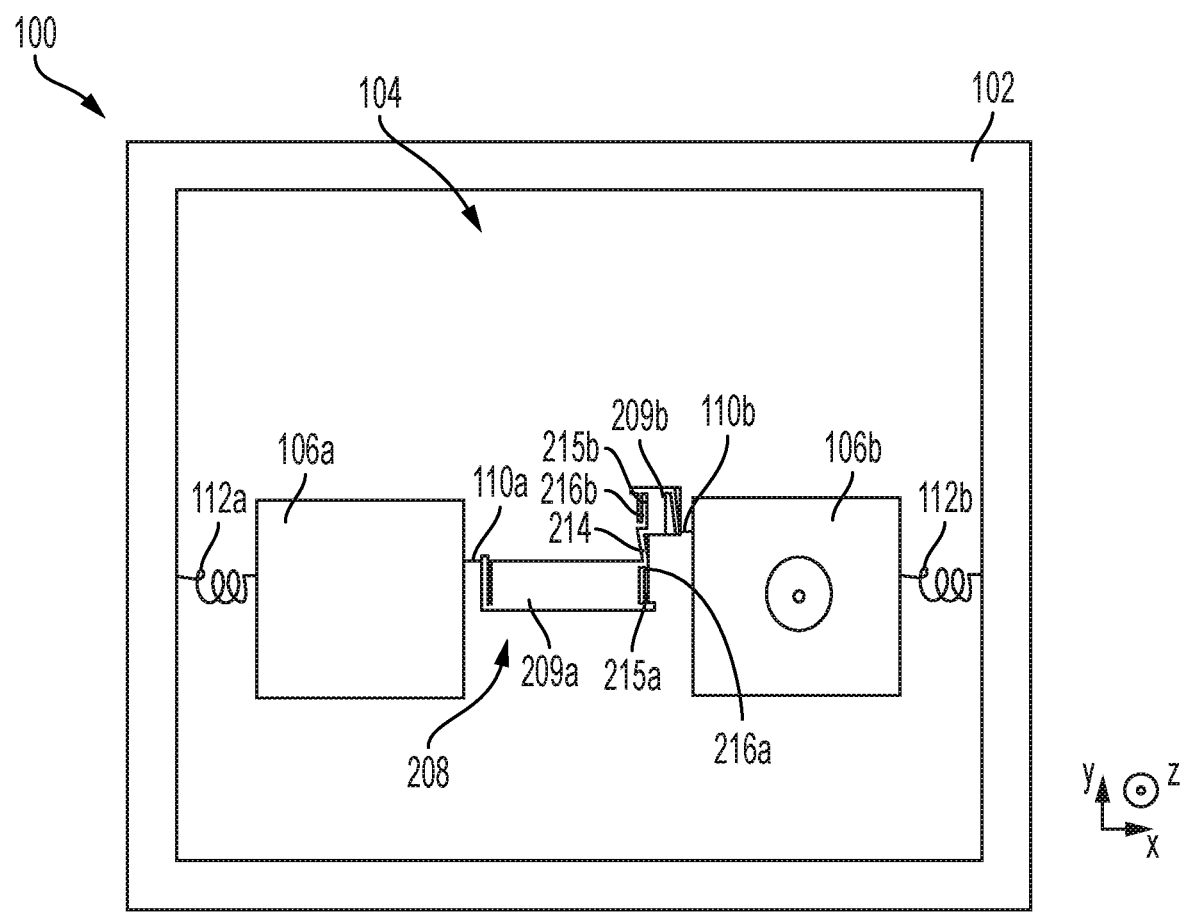
FIG. 7C is a schematic diagram of the example MEMS device of FIG. 7A showing out-of-plane displacement of one of the moving masses, according to some non-limiting embodiments.

FIG. 7B is a schematic diagram of the example MEMS device of FIG. 7A showing in-plane displacement of the moving masses, according to some non-limiting embodiments. As described herein, the first and second moving masses may be configured to move in-plane. For example, as shown in FIG. 7B, mass 106b is moving in-plane in the positive y-direction. The motion of mass 106b is coupled to mass 106a through coupler 208 causing mass 106a to move in the negative y-direction.

Although in the illustrated embodiment, the coupler 208 transfers the in-plane motion of mass 106b to mass 106a causing mass 106a to move in the opposite direction along the y-axis, in some embodiments, the coupler 208 is configured to transfer in-plane motion between moving masses such that both masses move in the same direction. In some embodiments, the in-plane motion transferred by the coupler 208 may be in the x-direction such that motion of one of the moving masses in the x-direction causes motion of the other moving mass in the x-direction, either in the same or opposite direction as the motion of the first moving mass.

As described herein, the magnitude of the transferred motion between moving masses may be controlled such that the displacement of a first mass may cause relatively less, relatively more, or equal displacement of the second mass as compared to the displacement of the first mass, for example, by controlling the relative lengths of the first and second levers. For example, in the illustrated embodiment, first lever 209a is longer than second lever 209b such that the relative displacement of the first mass 106a is larger than the relative displacement of the second mass 106b.

In the illustrated embodiment of FIG. 7B, coupling of in-plane motion between the moving masses 106a, 106b may be facilitated through coupler 208, and in particular, spring 214, springs 110a, 110b and first and second tethers 215a, 215b. For example, the spring 214 may be coupled to a point on each of the first and second levers 209a, 209b which experiences large in-plane motion upon motion of the moving masses 106a, 106b. As shown in FIG. 7B, when the second mass 106b moves in the positive y-direction, a top portion of the second lever moves away from the second mass 106b (e.g., by rotating counter-clockwise to move a right side of the second lever 209b upwards in the positive y-direction). The resulting motion is coupled through spring 214 causing the first lever 209a to deflect upwards at an end of the first lever 209a which is coupled to spring 110a.

In particular, spring 110b and second tether 215b coupling second lever 209b to second anchor 216b constrains the motion of the second lever 209b in the y-direction. Spring 110b and second tether 215b may have relatively little to no compliancy in the y-direction such that when second mass 106b moves in the y-direction, spring 110b and second tether 215b are resistant to compression in the y-direction. The coupling of second tether 215b to second anchor 216b may cause the second lever 209b to rotate counter-clockwise as opposed to moving upward in the positive y-direction. The counter-clockwise rotation of second lever 209b may cause spring 214 to deflect along the x-axis. Deflection of spring 214 may cause downward motion in the negative y-direction of first lever 209a at the point where spring 214 is coupled to the first lever 209a and deflection of spring 110a in the x-direction. Spring 110a may, as a result, pull first mass 106a downward in the negative y-direction, thus transferring the in-plane motion of the second mass 106b to first mass 106a through coupler 208.

FIG. 7C is a schematic diagram of the example MEMS device of FIG. 7A showing out-of-plane displacement of one of the moving masses, according to some non-limiting embodiments. As described herein, coupler 208 may prevent out-of-plane motion of one moving mass from coupling, through coupler 208, to the other moving mass. As shown in FIG. 7C, second mass 106b is moving out-of-plane in the positive z-direction. However, the out-of-plane motion of the second mass 106b is prevented from transferring to the first mass 106b, and is instead absorbed by coupler 208.

In particular, spring 214 may facilitate decoupling of out-of-plane motion between the moving masses 106a, 106b. The spring 214 may be coupled to a point on each of the first and second levers 209a, 209b which exhibits little to no out-of-plane motion upon motion of the moving masses 106a, 106b. The spring 214 may be configured to be more compliant out-of-plane (torsionally compliant) than compliant in-plane (bendably compliant), such that when one of the moving masses moves out-of-plane along the z-axis, the out-of-plane motion is absorbed by the spring

214, as shown in FIG. 7C, preventing the out-of-plane motion from transferring, through coupler 208, to the other moving mass. Thus, the embodiment of FIGS. 7A-7C illustrates a coupling structure which couples in-plane motion of masses and decouples out-of-plane motion of the masses.

As described herein, MEMS devices having couplers of the types described herein may be deployed in various settings to detect angular rates, including sports, healthcare, military, and industrial applications, among others. A MEMS device (e.g., a MEMS inertial sensor such as a MEMS gyroscope, for example) may be mounted as a wearable sensor deployed in monitoring sports-related physical activity and performance, patient health, military personnel activity, or other applications of interest of a user. A MEMS gyroscope may be disposed in a smartphone, and may be configured to sense roll, pitch and/or yaw angular rates.

Figure 8:
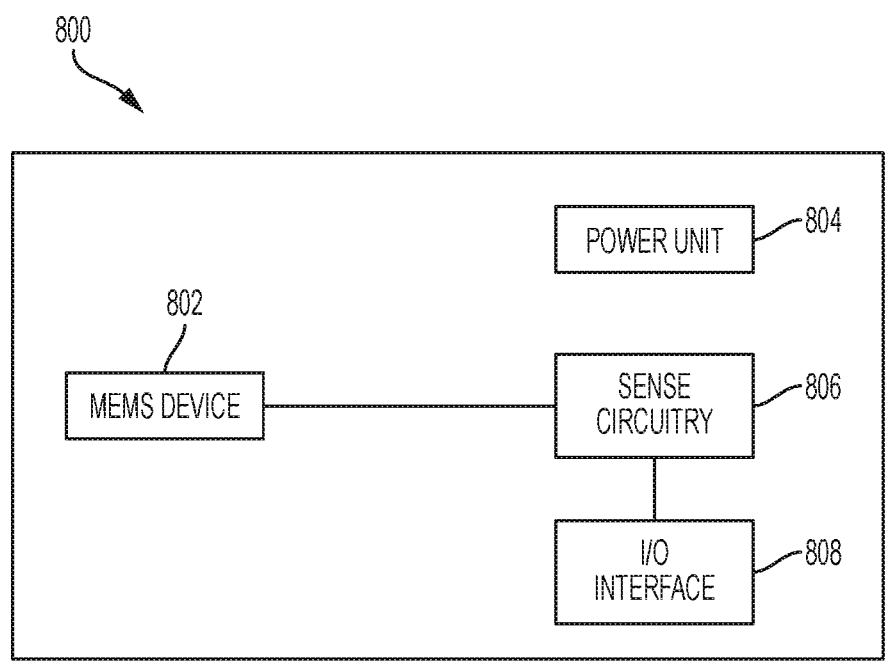
FIG. 8 is a block diagram illustrating an example system including a MEMS gyroscope, according to some non-limiting embodiments.

FIG. 8 is a block diagram illustrating a system 800 comprising a MEMS device 802, a power unit 804, sense circuitry 806 and input/output (I/O) interface 808. MEMS device 802 may comprise any one or a combination of the MEMS devices described herein. In some embodiments, the MEMS device(s) may comprise a MEMS gyroscope configured to sense roll, pitch and/or yaw angular rates.

System 800 may periodically transmit, via wired connections or wirelessly, data representing sensed angular rates to an external monitoring system, such as a computer, a smartphone, a tablet, a smartwatch, smartglasses, or any other suitable receiving device. I/O interface 808 may be configured to transmit and/or receive data via Wi-Fi, Bluetooth, Bluetooth Low Energy (BLE), Zigbee, Thread, ANT, ANT+, IEEE 802.15.4, IEEE 802.11.ah, or any other suitable wireless communication protocol. Alternatively, or additionally, I/O interface 808 may be configured to transmit and/or receive data using proprietary connectivity protocols. I/O interface 808 may comprise one or more antennas, such as a microstrip antenna. In some embodiments, I/O interface 808 may be connected to a cable, and may be configured to transmit and/or receive signals through the cable.

System 800 may be powered using power unit 804. Power unit 804 may be configured to power some or all of sense circuitry 806, I/O interface 808, and/or MEMS device 802. In some embodiments, power unit 804 may comprise one or more batteries. System 800 may, in at least some embodiments, consume sufficiently little power to allow for its operation for extended periods based solely on battery power. The battery or batteries may be rechargeable in some embodiments. Power unit 804 may comprise one or more lithium-ion batteries, lithium polymer (LiPo) batteries, super-capacitor-based batteries, alkaline batteries, aluminum-ion batteries, mercury batteries, dry-cell batteries, zinc-carbon batteries, nickel-cadmium batteries, graphene batteries or any other suitable type of battery. In some embodiments, power unit 804 may comprise circuitry to convert AC power to DC power. For example, power unit 804 may receive AC power from a power source external to system 800, such as via I/O interface 808, and may provide DC power to some or all the components of system 800. In such instances, power unit 804 may comprise a rectifier, a voltage regulator, a DC-DC converter, or any other suitable apparatus for power conversion.

Power unit 804 may comprise energy harvesting components and/or energy storage components, in some embodiments. Energy may be harvested from the surrounding environment and stored for powering the system 800 when needed, which may include periodic, random, or continuous powering. The type of energy harvesting components implemented may be selected based on the anticipated environment of the system 800, for example based on the expected magnitude and frequency of motion the system 800 is likely to experience, the amount of stress the system is likely to experience, the amount of light exposure the system is likely to experience, and/or the temperature(s) to which the system is likely to be exposed, among other possible considerations. Examples of suitable energy harvesting technologies include thermoelectric energy harvesting, magnetic vibrational harvesting, electrical overstress harvesting, photovoltaic harvesting, radio frequency harvesting, and kinetic energy harvesting. The energy storage components may comprise supercapacitors in some embodiments.

Figure 9:
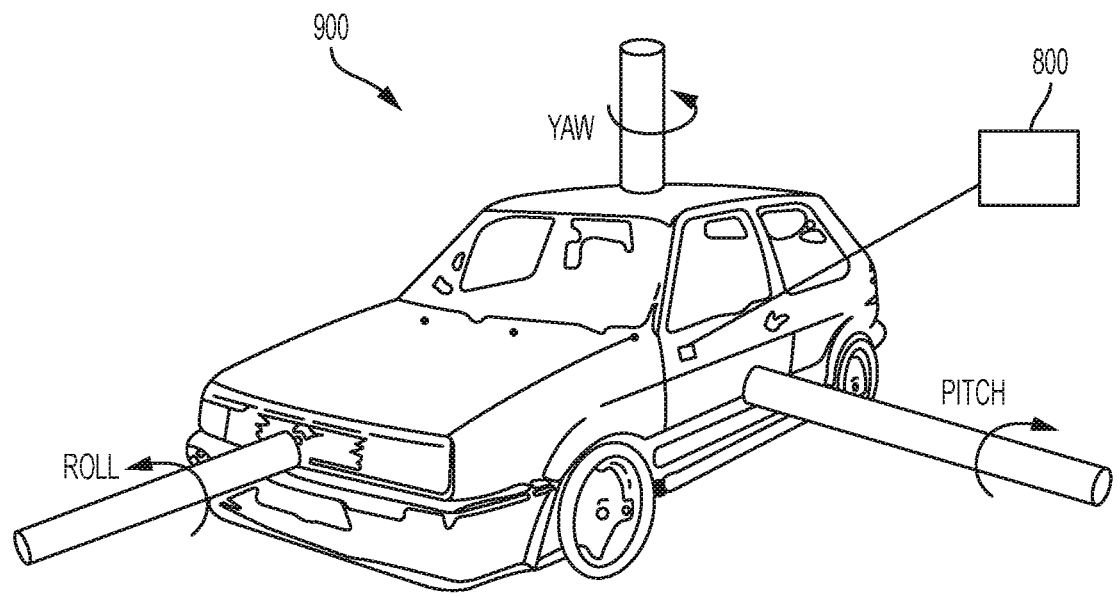
FIG. 9 is a perspective view illustrating an automobile including an example system having a MEMS gyroscope, according to some non-limiting embodiments.

As described above, MEMS devices of the types described herein may be deployed in various settings, for example, to detect angular rates. One such setting is in automobiles, or other vehicles, such as boats or aircrafts. FIG. 9 illustrates schematically an automobile 900 comprising a system 800, according to some non-limiting embodiments. System 800 may be disposed in any suitable location of automobile 900. In some embodiments, the system 800 may comprise a package or housing attached to a suitable part of the automobile 900, with the MEMS device inside. In some embodiments, system 800 may be configured to sense roll, pitch and/or yaw angular rates. System 800 may be configured to provide, using I/O interface 808, sensed angular rates to a computer system disposed in automobile 900 and/or to a computer system disposed on a base station outside automobile 900.

Another setting in which MEMS devices having couplers of the types described herein may be used is in sensor devices for sports applications, such as tennis, swimming, running, baseball, or hockey, among other possibilities. In some embodiments, a MEMS device of the types described herein may be a wearable fitness device. In other embodiments, the sensor may be part of a piece of sporting equipment, such as being part of a tennis racket, baseball bat, or hockey stick. Sense data from the sensor may be used to assess performance of the user.

Aspects of the technology described herein may provide one or more benefits, some of which have been previously described. Now described are some non-limiting examples of such benefits. It should be appreciated that not all aspects and embodiments necessarily provide all of the benefits described herein. Further, it should be appreciated that aspects of the technology described herein may provide additional benefits to those described herein.

Aspects of the technology described herein provide a selective coupler configured to selectively couple in-plane motion between first and second moving masses, while decoupling out-of-plane motion between the moving masses. In some embodiments, the selective coupler may comprise first and second levers being coupled together by a spring. In some embodiments, the selective coupler may be implemented a MEMS device, such as a MEMS inertial sensor (e.g., resonators, accelerometers, gyroscopes, etc.).

The expressions "substantially in a direction" and "substantially parallel to a direction" should be interpreted herein as parallel to the direction or angled with respect to the direction by less than 20°, including any value within that range.

The terms "approximately" and "about" may be used to mean ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A microelectromechanical systems (MEMS) inertial gyroscope, comprising:
   a sensing mass configured to be driven in-plane and to move out-of-plane in response to rotation of the MEMS inertial gyroscope;
   a mechanical drive array configured to move in-plane to drive the sensing mass in-plane; and
   a coupler coupling the mechanical drive array and the sensing mass and comprising two levers coupled to an anchor point by respective tethers and coupled to each other by a spring, wherein each of the respective tethers is compliant to in-plane and out-of-plane motion.

2. The MEMS inertial gyroscope of claim 1, further comprising respective end connections connecting the two levers to the mechanical drive array and the sensing mass.

3. The MEMS inertial gyroscope of claim 1, wherein the two levers comprise first and second levers, and a length of the second lever is at least twice a length of the first lever.

4. The MEMS inertial gyroscope of claim 3, wherein the first lever is coupled to the mechanical drive array by an end connection.

5. The MEMS inertial gyroscope of claim 1, wherein the two levers comprise first and second levers, the first lever is coupled to a first end of the spring and the second lever is coupled to a second end of the spring.

6. A microelectromechanical systems (MEMS) inertial sensor, comprising:
   a substrate; and
   first and second masses coupled to the substrate, and coupled together by a coupler and configured to move in-plane with each other;
   wherein the coupler comprises two levers coupled to respective masses of the first and second masses, the two levers being tethered to an anchor by respective tethers and coupled to each other by a spring;
   wherein each of the respective tethers is compliant to in-plane and out-of-plane motion; and
   the first mass comprises a drive array configured to cause in-plane motion of the second mass and the MEMS inertial sensor is a gyroscope configured to detect rotation from out-of-plane motion of the second mass.

7. The MEMS inertial sensor of claim 6, wherein the spring is a folded spring.

8. The MEMS inertial sensor of claim 6, wherein the spring comprises first and second longer segments joined by a shorter segment.

9. The MEMS inertial sensor of claim 6, wherein at least one of the tethers comprises a folded tether.

10. The MEMS inertial sensor of claim 6, wherein the two levers are substantially in-line with each other.

11. The MEMS inertial sensor of claim 10, wherein the spring is offset from the two levers.

12. The MEMS inertial sensor claim 6, wherein the two levers are offset from each other and the spring comprises a straight spring.

13. A microelectromechanical systems (MEMS) device, comprising:
   a substrate;
   a first mass;
   a second mass; and
   a coupler coupling the first and second masses together and configured to transfer in-plane motion between the first and second masses and to decouple out-of-plane motion of the first and second masses, wherein the coupler comprises first and second levers coupled to an anchor point by respective tethers and coupled to each other by a spring, and
   wherein at least one of the respective tethers is compliant to in-plane and out-of-plane motion, the first mass comprises a drive array configured to cause in-plane motion of the second mass, and the MEMS device is a gyroscope configured to detect in-plane rotation from out-of-plane motion of the second mass.

14. The MEMS device of claim 13, wherein the coupler is configured to absorb the out-of-plane motion of the first and second masses.

15. The MEMS device of claim 13, wherein the spring comprises a folded spring coupling the first and second levers.

* * * * *